US006941402B2

United States Patent
Tashiro (10) Patent No.: US 6,941,402 B2
(45) Date of Patent: Sep. 6, 2005

(54) IC CARD, DATA PROCESSING APPARATUS, AND SYSTEM USING COMMON SIGNAL LINES AND COMMON RESISTOR FOR DIFFERENTIAL SIGNALS AND SINGLE END SIGNALS

(75) Inventor: Jun Tashiro, Kanagawa (JP)

(73) Assignee: Sony Corporation (JP)

( * ) Notice: Subject to any disclaimer, the term of this patent is extended or adjusted under 35 U.S.C. 154(b) by 346 days.

(21) Appl. No.: 10/182,963

(22) PCT Filed: Dec. 11, 2001

(86) PCT No.: PCT/JP01/10839

§ 371 (c)(1),
(2), (4) Date: Oct. 9, 2002

(87) PCT Pub. No.: WO02/48854

PCT Pub. Date: Jun. 20, 2002

(65) Prior Publication Data

US 2003/0089785 A1 May 15, 2003

(30) Foreign Application Priority Data

Dec. 12, 2000 (JP) .................................. 2000-377972

(51) Int. Cl.⁷ ........................... G06F 1/00; G06K 19/06
(52) U.S. Cl. ................. 710/301; 710/302; 710/300; 710/305; 235/492
(58) Field of Search .......................... 710/300–306, 710/8–16, 313–315, 62–64, 262, 267, 72; 713/600–601; 235/492; 365/51–52, 226

(56) References Cited

U.S. PATENT DOCUMENTS 5,761,528 A * 6/1998 Arai .............................. 710/2
6,035,357 A * 3/2000 Sakaki ........................ 710/301
6,223,298 B1 * 4/2001 Tellier et al. ................ 713/501
6,272,570 B1 * 8/2001 Kasai .......................... 710/74
6,292,858 B1 * 9/2001 Inkinen et al. .............. 710/301
6,735,105 B2 * 5/2004 Nakano ........................ 365/52

FOREIGN PATENT DOCUMENTS

| JP | 11-234348 A1 | 8/1999 |
| JP | 2000-163172 A1 | 6/2000 |
| JP | 2001-307025 A1 | 11/2001 |

* cited by examiner

Primary Examiner—Paul R. Myers
Assistant Examiner—Raymond N Phan
(74) Attorney, Agent, or Firm—Lerner, David, Littenberg, Krumholz & Mentlik, LLP (57) ABSTRACT

Single end signal communication is provided in a first direction from a single end signal transmitter to a single end signal receiver through at least one dumping resistor and may be provided in another direction from another single end signal transmitter to another single end signal receiver through the at least one dumping resistor. During the single end signal communication, differential signal transmitters and differential signal receivers are disabled so that the communication path of the differential signal has a high impedance. Differential signal communication is also provided in the first direction from one of the differential signal transmitters to one of the differential signal receivers through a first termination resistor that also serves as the dumping resistor and may be provided in the another direction from another of the differential signal transmitters to another of the differential signal receivers through another termination resistor that also serves as another dumping resistor. During the differential signal communication, the single end signal transmitters and the single end signal receivers are disabled so that the communication path of the single end signal has a high impedance.

20 Claims, 8 Drawing Sheets

IC CARD, DATA PROCESSING APPARATUS, AND SYSTEM USING COMMON SIGNAL LINES AND COMMON RESISTOR FOR DIFFERENTIAL SIGNALS AND SINGLE END SIGNALS

TECHNICAL FIELD

The present invention relates to an IC card that is removable and that allows both a single end signal and a differential signal to co-exist, an IC card system therewith, and a data processing apparatus therewith.

BACKGROUND ART

As an interface for a data processing apparatus and an IC card, a structure that uses a single end signal and a structure that uses a low amplitude differential signal are available. The single end signal is a signal having for example a TTL level (for example, 3.3 V). The differential signal is a signal having a level of for example ±200 mV. When a single end signal is used, the number of lines required therefor is the half of that for a differential signal. Thus, the number of signal lines does not increase, a single end signal has been widely used. On the other hand, when a differential signal is used, since the signal level is low, the power consumption can be decreased. In addition, as an advantage of a differential signal, it is not affected by noise.

When a conventional IC card is provided with an interface that uses a single end signal, if an interface that uses a differential signal is added to the IC card, it is desired to perform transmissions of both the single end signal and the differential signal so as to maintain the compatibility of the conventional IC card and the data processing apparatus. Normally, since the level of a single end signal is largely different from the level of a differential signal, different signal lines are used for their interfaces.

However, in the limited space of the IC card or the like, the number of signal lines cannot be easily increased. To solve such a problem, a structure that transmits and receives a single end signal using one of the signal lines for the differential signal may be considered. When such a structure, which transmits and receives a single end signal using only one of the differential signal lines is used, stray capacitances of a single end signal transmitter or a single end signal receiver may cause the differential signal lines to be an unbalanced state. In addition, when a communication is made with a single end signal at high speed, a dumping resistor should be disposed in series with the signal lines so as to prevent the single end signal from overshooting or undershooting. In addition, a termination resistor should be disposed in parallel with the signal lines of a differential signal. Thus, when an interface that uses these two types of signals is structured, the number of parts adversely increases.

Therefore, an object of the present invention is to provide a data processing apparatus, an IC card, and an IC card system that allow differential signal lines to be in a balanced state and that prevent the number of parts from being adversely increased.

DISCLOSURE OF THE INVENTION

To solve the forgoing problem, an aspect of the invention includes an IC card that is removable from a data processing apparatus. A first transmitting method using a differential signal and a second transmitting method using a single end signal are selectable as a transmitting method for transmitting a signal between the IC card and the data processing apparatus. A part of signal lines routed between the IC card and the data processing apparatus are shared by the first transmitting method and the second transmitting method.

Another aspect of the invention includes an IC card system having a data processing apparatus and an IC card that is removable therefrom. A first transmitting method using a differential signal and a second transmitting method using a single end signal are selectable as a transmitting method for transmitting a signal between the IC card and the data processing apparatus. A part of signal lines routed between the IC card and the data processing apparatus are shared by the first transmitting method and the second transmitting method.

A further aspect of the invention includes a data processing apparatus that uses an IC card that is removable therefrom. A first transmitting method using a differential signal and a second transmitting method using a single end signal are selectable as a transmitting method for transmitting a signal between the data processing apparatus and the IC card. A part of signal lines routed between the data processing apparatus and the IC card are shared by the first transmitting method and the second transmitting method.

According to the present invention, since signal lines for a differential signal and a single end signal are shared, the number of signal lines can be prevented from increasing. In addition, since a termination resistor for a differential signal is shared with a dumping resistor for a single end signal, the number of parts can be decreased.

BEST MODES FOR CARRYING OUT THE INVENTION

Next, with reference to the accompanying drawings, an embodiment of the present invention will be described. First of all, an example of an IC card (memory device) according to an embodiment of the present invention will be described.

Figure 1:
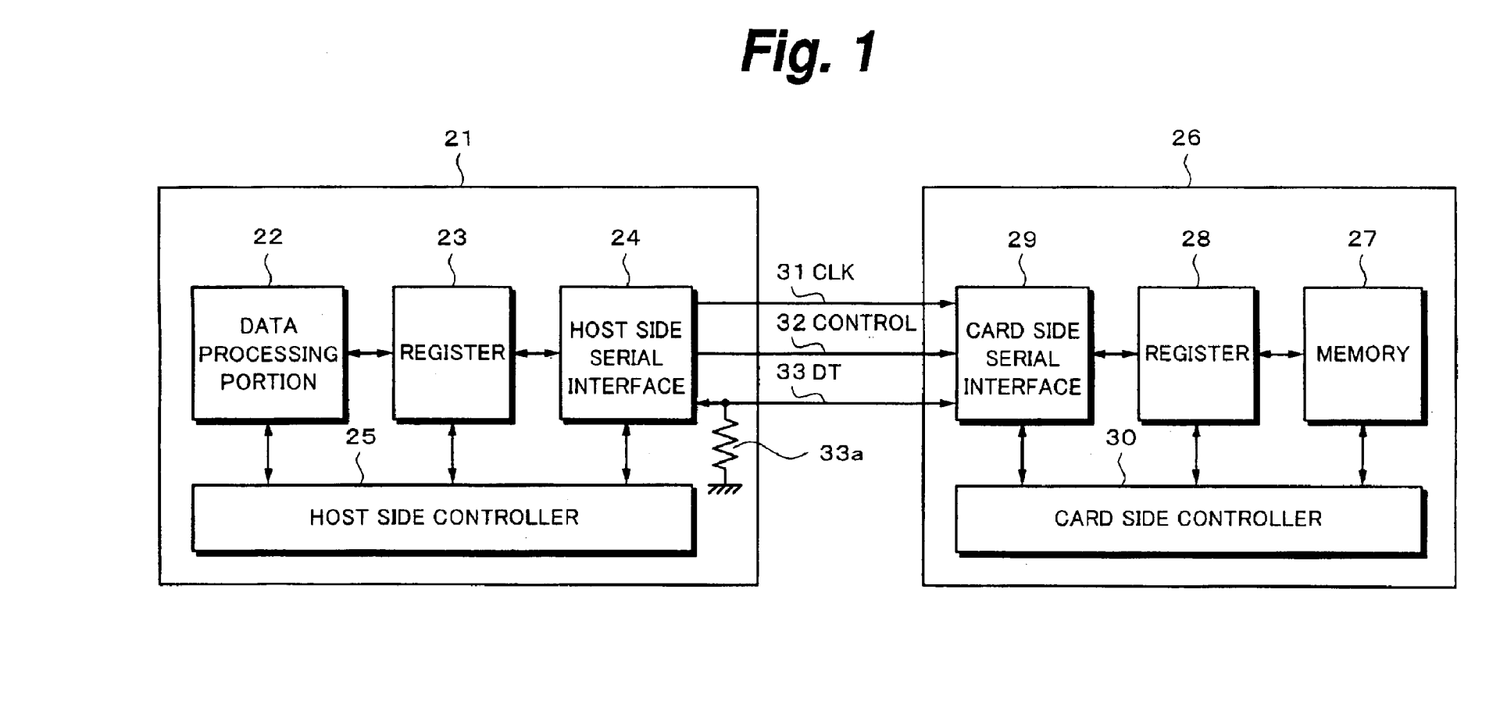
FIG. 1 is a block diagram showing the structure of a data processing apparatus and an IC card according to an embodiment of the present invention.

FIG. 1 shows the structure of a system composed of a data processing apparatus 21 and an IC card 26. The data processing apparatus 21 comprises a data processing portion 22, a register 23, a host side serial interface circuit 24, and a host side controller 25. On the other hand, the IC card 26 is a card-shaped storage medium. The IC card 26 is used as an external storage device that is connected to the data processing apparatus 21. The IC card 26 comprises a memory 27, a register 28, a card side serial interface circuit 29, and a card side controller 30.

The data processing portion 22 of the data processing apparatus 21 reads stored data from the IC card 26 and performs a variety of data processes. In addition, the data processing portion 22 performs a variety of data processes and generates data to be written to the IC card 26. In other words, the data processing portion 22 is a data processing circuit of a computer, a recording/reproducing device for a digital audio signal, or an audio visual device such as a camera that uses the IC card 26.

The register 23 is a buffer disposed between the data processing portion 22 and the host side serial interface circuit 24. In other words, when data is supplied from the data processing portion 22 to the host side serial interface circuit 24, the data processing apparatus 21 temporarily stores the data to the register 23 and then supplies the data to the host side serial interface circuit 24. Likewise, when data is supplied from the host side serial interface circuit 24 to the data processing portion 22, the data processing apparatus 21 temporarily stores the data to the register 23 and then supplies the data to the data processing portion 22.

The host side serial interface circuit 24 converts the data supplied from the data processing portion 22 through the register 23 and a command supplied from the host side controller 25 into a serial signal and supplies the serial signal to the IC card 26. In addition, the host side serial interface circuit 24 converts data and command of the serial signal supplied from the IC card 26 into parallel signals and supplies the parallel signals to the data processing portion 22 and the host side controller 25.

The host side serial interface circuit 24 supplies a synchronous signal (CLK) and so forth for various types of data and a command to the IC card 26. The host side serial interface circuit 24 receives a status signal from the IC card 26. The status signal represents an operating state of the IC card 26.

The host side controller 25 controls a data processing operation of the data processing portion 22 and a data transmitting operation for each type of data of the host side serial interface circuit 24. In addition, the host side controller 25 supplies a control command to the IC card 26 through the register 28 so as to control the IC card 26.

On the other hand, the memory 27 of the IC card 26 is composed of for example a flash memory. The memory 27 stores data supplied from the data processing portion 22.

The register 28 is a buffer disposed between the memory 27 and the card side serial interface circuit 29. In other words, when data supplied from the data processing apparatus 21 is written to the memory 27, the data is temporarily stored to the register 23 and then supplied to the memory 27. Likewise, when data is read to the data processing apparatus 21 from the memory 27, the data is temporarily stored to the register 23 and then supplied to the card side serial interface circuit 29. In other words, the register 28 is a circuit that functions as a so-called page buffer of the flash memory.

The card side serial interface circuit 29 converts data of a parallel signal supplied from the memory 27 and a command supplied from the card side controller 30 into a serial signal and supplies the serial signal to the data processing apparatus 21 under the control of the card side controller 30. In addition, the card side serial interface circuit 29 converts data of a serial signal and a command supplied from the data processing apparatus 21 into parallel signals and supplies the parallel signals to the memory 27 and the card side controller 30.

In addition, the card side serial interface circuit 29 receives a synchronous signal (CLK) for each type of data and a command from the data processing apparatus 21. Moreover, the card side serial interface circuit 29 supplies a status signal to the data processing apparatus 21.

The card side controller 30 controls a storing operation, a reading operation, an erasing operation, an so forth for data of the memory 27 corresponding to a command or the like supplied from the data processing apparatus 21. In addition, the card side controller 30 controls a transmitting operation of the card side serial interface circuit 29 for each type of data. On the other hand, the host side controller 25 controls an operation for supplying a status signal supplied to the IC card 26.

Data is transmitted between the data processing apparatus 21 and the IC card 26 through a transmission line disposed between the host side serial interface circuit 24 and the card side serial interface circuit 29.

Three signal lines that are a CLK line 31, a control line 32, and a DT line 33 are routed between the host side serial interface circuit 24 of the data processing apparatus 21 and the card side serial interface circuit 29 of the IC card 26.

Main data that is processed by the data processing portion 22 and written to the memory 27 and data that is read from the memory 27 to the data processing portion 22 are transmitted through the DT line 33. In addition, a control command that is supplied from the data processing apparatus 21 to the IC card 26 and a command that is supplied from the IC card 26 to the data processing apparatus 21 are transmitted through the DT line 33. In other words, main data and commands are transmitted in two ways (bi-directionally) through the DT line 33.

A resistor 33a is connected between the DT line 33 and the ground. The resistor 33a is a so-called pull down resistor. When no signal is transmitted and received between the host side serial interface circuit 24 and the card side serial interface circuit 29 through the DT line 33, the signal level of the DT line 33 is low. In other words, when no signal is transmitted and received through the DT line 33, the signal level of the DT line 33 is in a fixed level that depends on the resistance of the resistor 33a or the like.

In the example, the resistor 33a is a so-called pull down resistor. When no signal is being transmitted or received through the DT line 33, the signal level of the DT line 33 is low. Alternatively, the resistor 33a may be a so-called pull up resistor, and when no signal is being transmitted or received through the DT line 33, the signal level of the DT line 33 is high.

A synchronous signal for main data and a command that are transmitted through the DT line 33 is transmitted from the data processing apparatus 21 to the IC card 26 through the CLK line 31.

A control signal is transmitted from the data processing apparatus 21 to the IC card 26 through the control line 32. While the control signal is being supplied (namely, while the signal level of the control line 32 is high), the forgoing main data and command are transmitted.

In addition to the main data and command, a status signal that represents the operating state of the IC card 26 is supplied from the IC card 26 to the data processing apparatus 21 through the DT line 33. While main data and a command are not being supplied through the DT line 33 (namely, while a control signal is not being supplied: the signal level of the DT line 33 is low), the status signal is supplied from the IC card 26.

The status signal includes a busy signal that represents that the IC card 26 is performing a process. While the IC card 26 is performing a writing process, the IC card 26 prohibits the data processing apparatus 21 from accessing it, and the busy signal is supplied from the IC card 26 to the data processing apparatus 21. The status signal also includes an interrupt signal that represents an interrupt supplied from the IC card 26 to the data processing apparatus 21. When the IC card 26 requests the data processing apparatus 21 for an interrupt, the IC card 26 supplies the interrupt signal to the data processing apparatus 21. The busy signal and the interrupt signal are just examples of the status signal. As long as the status signal is a signal that represents the operating state of the IC card 26, the status signal may be any signal.

Figure 2:
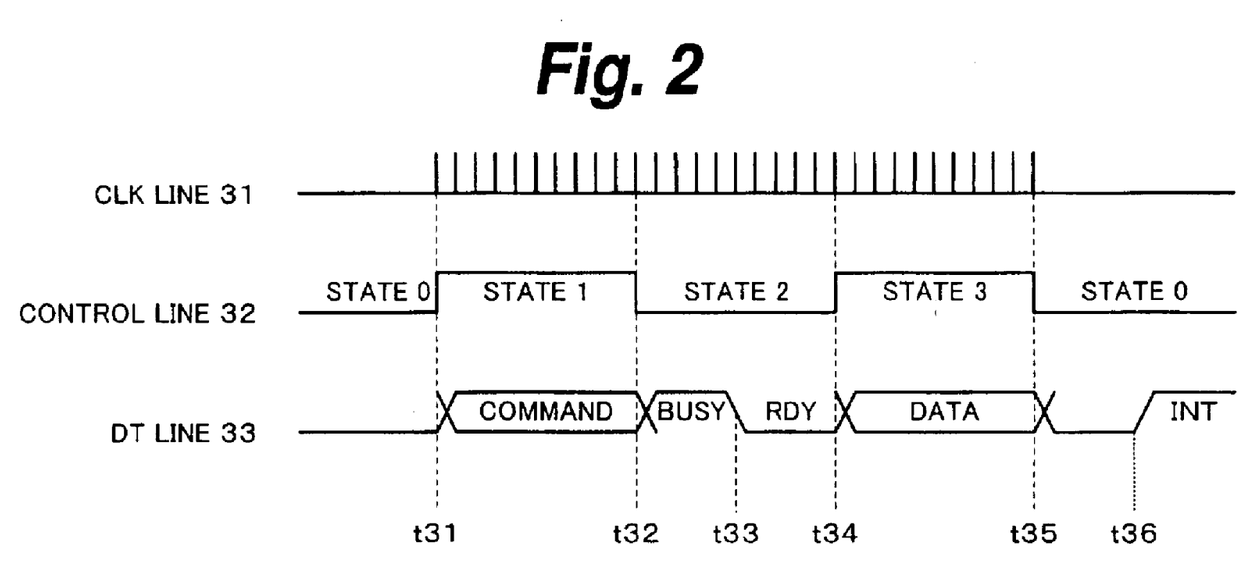
FIG. 2 is a timing chart of data that is transmitted and received between the data processing apparatus and the IC card.

FIG. 2 shows a timing chart for which data is read from the IC card 26. In other than state 0 (initial state), a clock that synchronizes with data is transmitted through the CLK line 31. While any data is not being transmitted and received between the data processing apparatus 21 and the IC card 26, the signal level of the control line 32 is low. This state is referred to as state 0 (initial state). At timing t31, the data processing apparatus 21 causes the signal level of the control line 32 to be high. This state is referred to as state 1.

When the signal level of the control line 32 becomes high, the IC card 26 detects that state 0 has been changed to state 1. In state 1, a read command is transmitted from the data processing apparatus 21 to the IC card 26 through the DT line 33. The IC card 26 receives the read command. The read command is a protocol command referred to as serial interface TPC. As will be described later, the protocol command designates the content of the communication and the length of data that follows.

After the command has been transmitted, the signal level of the control line 32 is changed from high to low at timing t32. As a result, state 1 is changed to state 2. In state 2, the IC card 26 performs a process designated by the received command. In reality, the IC card 26 performs a process for reading data of an address designated by the read command from the memory 27. While this process is being performed, the busy signal is transmitted to the data processing apparatus 21 through the DT line 33 (the signal level of the DT line 33 is high).

After the data has been read from the memory 27, the output of the busy signal is stopped and then the output of the ready signal that represents that the IC card 26 is ready to transmit data to the data processing apparatus 21 is started at timing t33 (the signal level of the DT line 33 is low).

When the data processing apparatus 21 receives the ready signal from the IC card 26, the data processing apparatus 21 knows that the IC card 26 is ready to perform the process corresponding to the read command. The data processing apparatus 21 causes the signal level of the control line 32 to be high at timing t34. In other words, state 2 is changed to state 3.

In state 3, the IC card 26 outputs data that has been read to the register 28 in state 2 to the data processing apparatus 21 through the DT line 33. After the read data has been transmitted to the data processing apparatus 21, it stops transmitting the clock to the IC card 26 through the CLK line 31 at timing t35. In addition, the data processing apparatus 21 causes the signal level of the status line to be changed from high to low. As a result, state 3 is changed to initial state (state 0).

Assuming that when the internal state of the IC card 26 has been changed, a particular interrupting process is required. At that point, the IC card 26 supplies the interrupt signal to the data processing apparatus through the DT line 33 in state 0 at timing t36. When the data processing apparatus 21 receives a signal from the IC card 26 through the DT line 33 in state 0, the data processing apparatus 21 can recognize the received signal as the interrupt signal. When the data processing apparatus 21 has received the interrupt signal, the data processing apparatus 21 performs a required process corresponding to the interrupt signal.

Figure 3:
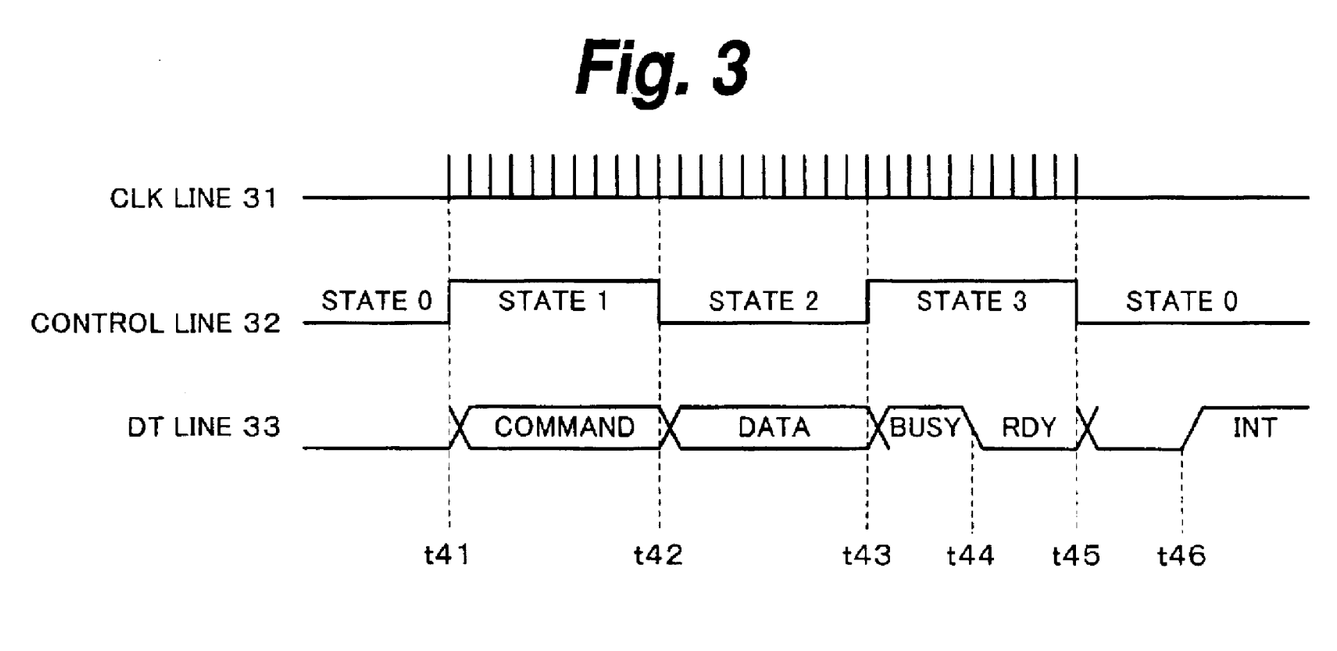
FIG. 3 is a timing chart of data that is transmitted and received between the data processing apparatus and the IC card.

FIG. 3 is a timing chart for which data is written to the memory 27 of the IC card 26. In initial state (state 0), the clock is not transmitted through the CLK line 31. The data processing apparatus 21 causes the signal level of the control line 32 to be changed form low level to high level at timing t41. As a result, state 0 is changed to state 1. In state 1, a write command is transmitted through the DT line 33. The IC card 26 is ready to receive the command in state 1. The command is transmitted to the IC card 26 through the DT line 33 at timing t41. The IC card 26 receives the write command.

After the write command has been transmitted, the data processing apparatus 21 causes the signal level of the control line 32 to be changed from high to low at timing t42. As a result, state 1 is changed to state 2. The data processing apparatus 21 transmits write data to the IC card 26 through the DT line 33 in state 2. The IC card 26 stores the received write data to the register 28.

After the write data has been transmitted, the data processing apparatus 21 causes the signal level of the control line 32 to be changed from low to high at timing t43. As a result, state 2 is changed to state 3. The IC card 26 writes the write data to the memory 27 in state 3. The IC card 26 transmits a busy signal to the data processing apparatus 21 through the DT line 33 in state 3 (the signal level of the DT line 33 is high). The data processing apparatus 21 transmits a write command to the IC card 26. Since the current state is state 3, the data processing apparatus 21 determines that a signal received from the IC card 26 is a status signal.

After the data writing process has been completed, the IC card 26 stops outputting the busy signal and transmits a ready signal to the data processing apparatus 21 at timing t44 (the signal level of the DT line 33 is low). When the data processing apparatus 21 receives the ready signal, the data processing apparatus 21 determines that the writing process corresponding to the write command has been completed. As a result, the data processing apparatus 21 stops transmitting the clock signal. The data processing apparatus 21 causes the signal level of the control line 32 from high to low at timing t45. As a result, state 3 is returned to state 0 (initial state).

When the data processing apparatus 21 has received a high level signal from the IC card 26 through the DT line 33 in state 0, the data processing apparatus 21 recognizes the received signal as an interrupt signal. The data processing apparatus 21 performs a required process corresponding to the received interrupt signal. For example, when IC card 26 is removed from the data processing apparatus 21, the IC card 26 generates the interrupt signal.

As well as the forgoing reading operation and writing operation, a command is transmitted in state 1 and then data corresponding to the command is transmitted in state 2.

Figure 4:
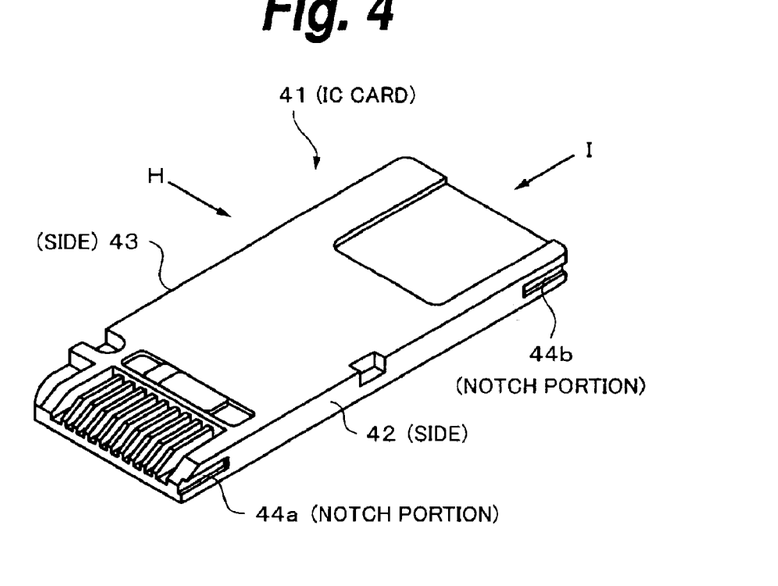
FIG. 4 is a perspective view showing an example of the shape of the IC card according to an embodiment of the present invention.
Figure 5:
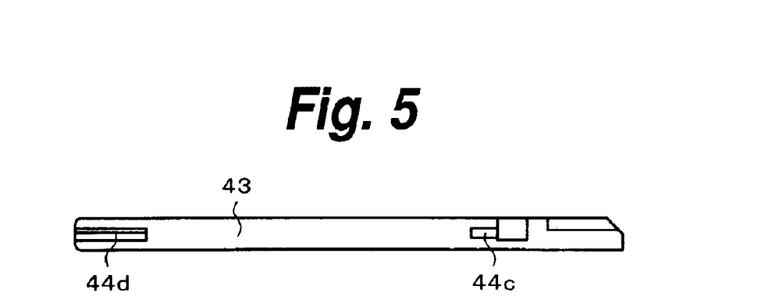
FIG. 5 is a schematic diagram showing the IC CARD viewed from H direction of FIG. 4.
Figure 6:
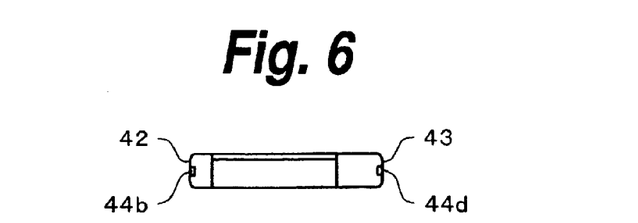
FIG. 6 is a schematic diagram showing the IC CARD viewed from I direction of FIG. 4.

FIG. 4 shows an appearance of the forgoing IC card. FIG. 5 shows the IC card 41 viewed from H direction of FIG. 4. FIG. 6 shows the IC card 41 viewed from I direction of FIG. 4. The IC card 41 has a nearly rectangular plane. The IC card 41 has two elongated sides that are a first side 42 and a second side 43. The first side 42 has two end portions in which mounting notch portions 44a and 44b are formed. As shown in FIG. 5, the second side 43 parallels the first side 42. Likewise, the second side 43 has two end portions in which mounting notch portions 44c and 44d are formed.

Figure 7:
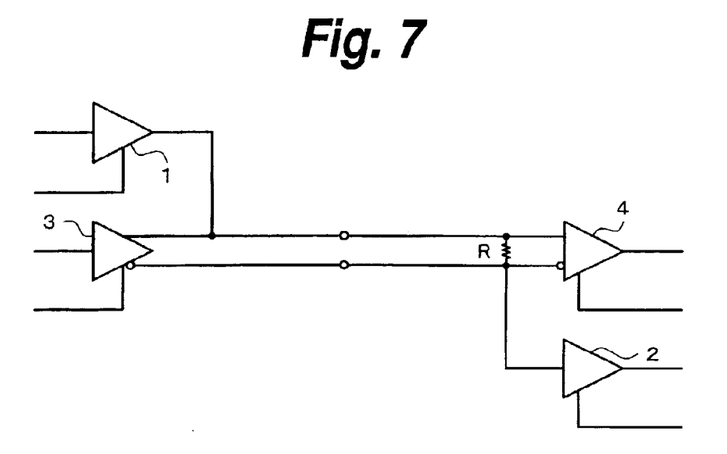
FIG. 7 is a diagram showing connections of a structure of a one-way communication interface according to an embodiment of the present invention.

The present invention is applied to an interface between the forgoing removable IC card and data processing apparatus. FIG. 7 shows the structure according to an embodiment of the present invention. The embodiment is applied to for example the control line 32 shown in FIG. 1 and has a structure of a one-way communicating circuit for a single end signal and a differential signal. In FIG. 7, reference numeral 1 represents a single end signal transmitter. Reference numeral 2 represents a single end signal receiver. Reference numeral 3 represents a differential signal transmitter. Reference numeral 4 represents a differential signal receiver. R represents a differential signal termination resistor. The differential signal termination resistor R is also used as a dumping resistor that prevents a single end signal that is transmitted and received at high speed from overshooting or undershooting.

When a communication is made with a single end signal, it is supplied from the single end signal transmitter 1 to the single end signal receiver 2 through the dumping resistor R. At that point, the differential signal transmitter 3 and the differential signal receiver 4 are disabled so that the communication path for the differential signal becomes a high impedance state.

When a communication is made with a differential signal, it is supplied from the differential signal transmitter 3 to the differential signal receiver 4 through the termination resistor R. At that point, the single end signal transmitter 1 and the single end signal receiver 2 are disabled so that the communication path of the single end signal becomes high impedance state.

Figure 8:
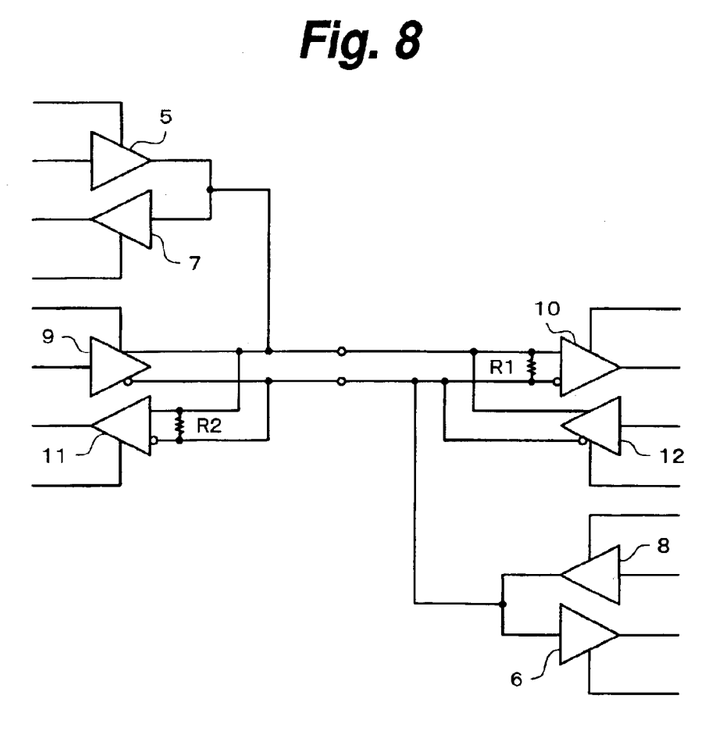
FIG. 8 is a diagram showing connections of a structure of a two-way communication interface according to another embodiment of the present invention.

FIG. 8 shows the structure of another embodiment of the present invention. The embodiment shown in FIG. 8 has the structure of a two-way communicating circuit for a single end signal and a differential signal applicable to the DT line 33 shown in FIG. 1. In FIG. 8, reference numerals 5 and 8 represent single end signal transmitters. Reference numerals 6 and 7 represent single end signal receivers. Reference numerals 9 and 12 represent differential signal transmitters. Reference numerals 10 and 11 represent differential signal receivers. R1 and R2 represent differential signal termination resistors. The differential signal termination resistors R1 and R2 are also used in parallel as a single end signal dumping resistor R1//R2.

When a communication is made in one direction with a single end signal, it is supplied from the single end signal transmitter 5 to the single end signal receiver 6 through the dumping resistor R1//R2. When a communication is made in the other direction with a single end signal, it is supplied from the single end signal transmitter 8 to the single end signal receiver 7 through the dumping resistor R1//R2. At that point, the differential signal transmitters 9 and 12 and the differential signal receivers 10 and 11 are disabled so that the communication path of the differential signal becomes a high impedance state.

When a communication is made in one direction with a differential signal, it is supplied from the differential signal transmitter 9 to the differential signal receiver 10 through the termination resistor R1. When a communication is made in the other direction with a differential signal, it is supplied from the differential signal transmitter 12 to the differential signal receiver 11 through the termination resistor R2. At that point, the single end signal transmitters 5 and 8 and the single end signal receivers 6 and 7 are disabled so that the communication path of the single end signal becomes a high impedance state.

Figure 9:
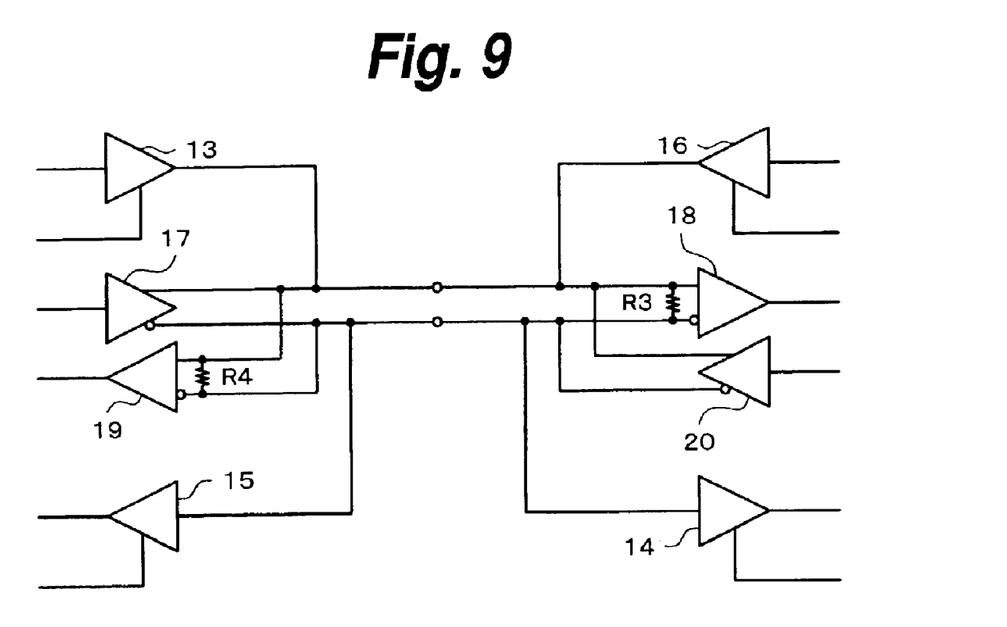
FIG. 9 is a diagram showing connections of a structure of a two-way communication interface according to a further embodiment of the present invention.

FIG. 9 shows the structure of a two-way communicating circuit according to another embodiment of the present invention. In FIG. 9, reference numerals 13 and 16 represent single end signal transmitters. Reference numerals 14 and 15 represent single end signal receivers. Reference numerals 17 and 20 represent differential signal transmitters. Reference numerals 18 and 19 represent differential signal receivers. R3 and R4 represent differential signal termination resistors. In addition, the differential signal termination resistors R3 and R4 may be also used in parallel as a single end signal dumping resistor R3//R4.

When a communication is made in one direction with a single end signal, it is supplied from the single end signal transmitter 13 to the single end signal receiver 14 through the dumping resistor R3//R4. When a communication is made in the other direction with a single end signal, it is supplied from the single end signal transmitter 16 to the single end signal receiver 15 through the dumping resistor R3//R4. At that point, the differential signal transmitters 17 and 20 and the differential signal receivers 18 and 19 are disabled so that the communication path of the differential signal becomes a high impedance state.

When a communication is made in one direction with a differential signal, it is supplied from the differential signal transmitter 17 to the differential signal receiver 18 through the termination resistor R3. When a communication is made in the other direction with a differential signal, it is supplied from the differential signal transmitter 20 to the differential signal receiver 19 through the termination resistor R4. At that point, the single end signal transmitters 13 and 16 and the single end signal receivers 14 and 15 are disabled so that the communication path of the single end signal becomes a high impedance state.

Figure 10:
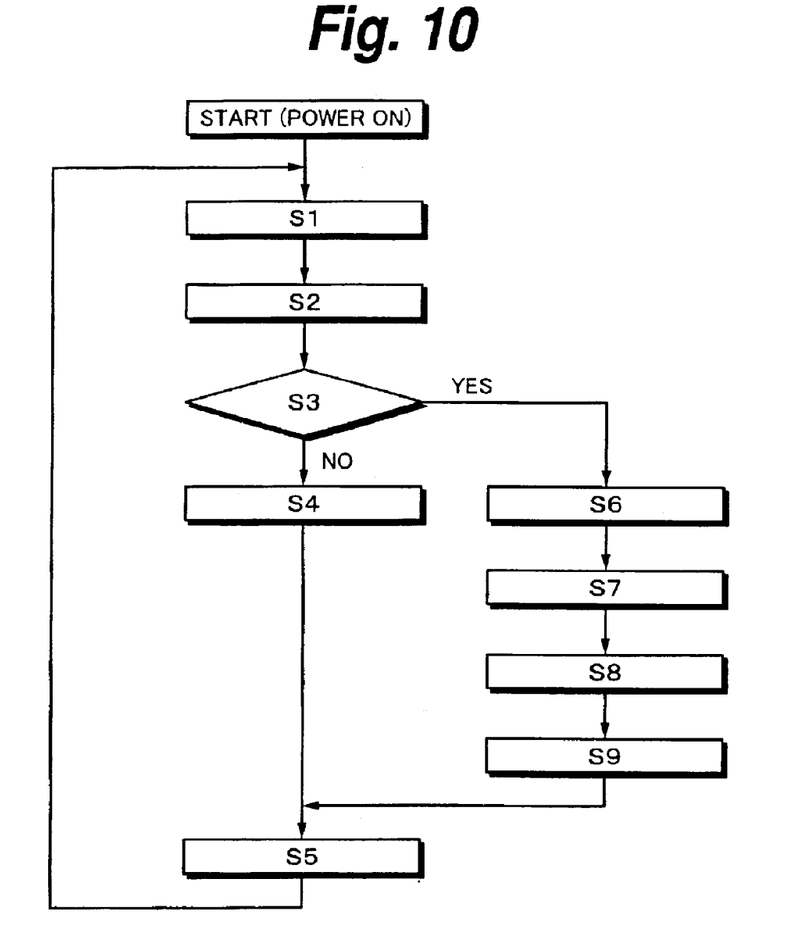
FIG. 10 is a flow chart showing an example of a method for detecting an interface system of an IC card.
Figure 11:
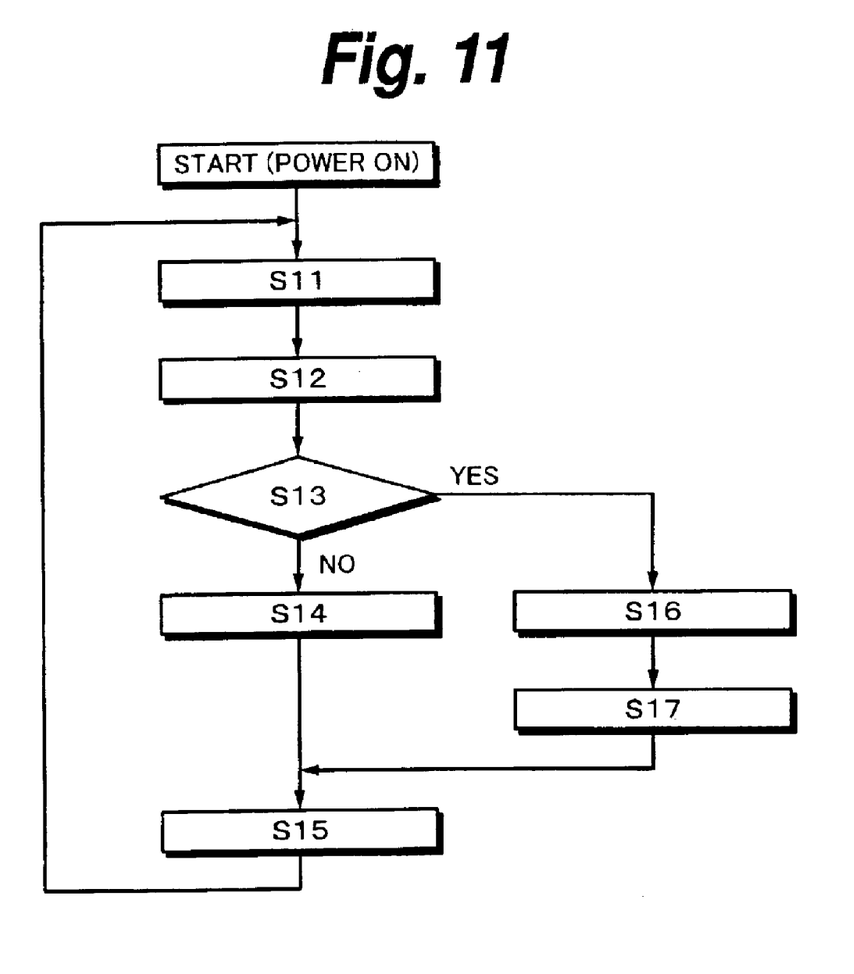
FIG. 11 is a flow chart showing an example of another method for detecting an interface system of an IC card.

As was described above, the IC card according to the present invention can be operated with the first transmitting method using a differential signal and the second transmitting method using a single end signal. In contrast, conventional IC cards are provided with one of those interfaces. An interface using a single end signal is referred to as conventional interface. On the other hand, an interface using a differential signal is referred to as new interface. FIG. 10 and FIG. 11 show examples of a process that a new type data processing apparatus (apparatus that uses an IC card) that can be operated with both the conventional interface and the new interface detects the interface of the IC card inserted thereinto.

In FIG. 10, a value of an interface mode is set to a non-volatile memory such as a ferroelectric memory disposed in a controller of the IC card. The interface mode is a code for example a one-bit flag. When the power of the data processing apparatus is turned on, the process gets started. At step S1, the IC card is operated with the conventional interface. This is because the conventional interface allows the IC card to securely communicate with the data processing apparatus regardless of whether the IC card is a new IC card or an old IC card.

At step S2, the data processing apparatus reads attribute data from a boot area of the IC card. At step S3, the data processing apparatus determines whether or not the inserted IC card that has been inserted into the data processing apparatus is provided with the new interface. When the IC card is provided with the conventional interface, the flow advances to step S4. At step S4, the IC card is operated with the conventional interface. The operation includes a reset operation. At step S5, when the IC card is removed from the data processing apparatus or reinserted thereinto, the flow returns to step S1 (the IC card is operated with the conventional interface).

When the determined result at step S3 represents that the IC card is provided with the new interface, the flow advances to step S6. At step S6, a value of the new interface is set to the non-volatile memory of the controller of the IC card. At step S7, a reset command is transmitted. At step S8, the operation of the IC card is switched from the conventional interface to the new interface. The new interface operation includes a reset operation. At step S9, a value of the conventional interface is set to the non-volatile memory. When the IC card is removed from the data processing apparatus or reinserted thereinto at step S5, the flow returns to step S1 (the IC card is operated with the conventional interface). At steps S8 and S9, the IC card is operated with the new interface.

FIG. 11 is a flow chart showing another example of the interface detecting process for the IC card. When the power of the data processing apparatus is turned on, the process gets started. At step S11, the IC card is operated with the conventional interface. At step S12, the data processing apparatus reads attribute data from the boot area of the IC card. At step S13, the data processing apparatus determines whether or not the IC card is provided with the new interface. When the IC card is provided with the conventional interface, the flow advances to step S14. At step S14, the IC card is operated with the conventional interface. The operation includes a reset operation. When the IC card is removed from the data processing apparatus or reinserted thereinto at step S15, the flow returns to step S11 (the IC card is operated with the conventional interface).

When the determined result at step S13 represents that the IC card is provided with the new interface, the flow advances to step S16. At step S16, the data processing apparatus transmits a reset command to the IC card. The reset command causes the value written in the non-volatile memory to be changed from the value of the conventional interface to the value of the new interface. As a result, the operation of the conventional interface of the IC card is switched to the operation of the new interface (at step S17). When the IC card is removed from the data processing apparatus or reinserted thereinto at step S15, the flow returns to step S11 (the IC card is operated with the conventional interface).

It should be noted that the present invention is not limited to the forgoing embodiments. Instead, without departing from the scope and spirit of the present invention, various ramifications and modifications of the forgoing embodiments are available.

According to the present invention, since a signal line is shared by a differential signal and a single end signal, the number of signal lines can be prevented from increasing. In addition, since a resistor is shared by a differential signal termination resistor and a single end signal dumping resistor, the number of parts can be decreased.

When a communication is made with a single end signal, a differential signal transmitter and a differential signal receiver are disabled so that the communication path of the differential signal becomes a high impedance state. When a communication is made with a differential signal, a single end signal transmitter and a single end signal receiver are disabled so that the communication path of the single end signal becomes a high impedance state. As a result, when the transmission path is short, the differential signal can be kept in a balanced state. When the transmission path is long and thereby a balanced state should be kept, the capacitance to be added corresponding to a dummy transmitter and a dummy receiver can be reduced.

What is claimed is:

1. An IC card removably connected to a data processing apparatus, comprising:
   a pair of signal lines; and
   an interface unit, including:
      a differential signal receiver operable to receive differential signals from a further interface unit disposed in the data processing apparatus and having a first terminal and a second terminal each directly connected to an associated one of said pair of signal lines,
      a resistor connected across said pair of signal lines adjacent to said first terminal and said second terminal, and
      a single end signal receiver operable to receive single end signals from the further interface unit and having a terminal that is directly connected to a given one of said pair of signal lines and that is connected to another of said pair of signal lines via said resistor,
      said resistor thereby operating as a termination resistor when said differential signal receives the differential signals and operating as a dumping resistor when said single end signal receiver receives the single end signals.

2. An IC card according to claim 1, wherein said pair of signal lines are control signal lines.

3. An IC card according to claim 1, wherein said single end signal receiver is disabled when said differential signal receiver receives the differential signals, and said differential signal receiver is disabled when said single end signal receiver receives the single end signals.

4. An IC card according to claim 1, wherein
   said interface unit further includes:
      a differential signal transmitter operable to transmit differential signals to the further interface unit and having a first terminal and a second terminal each directly connected to a corresponding one of said pair of signal lines, and
      a single end signal transmitter operable to transmit single end signals to the further interface unit and having a terminal that is directly connected to a respective one of said pair of signal lines and that is connected to a further one of said pair of signal lines via said resistor; and
   said resistor thereby operates as a termination resistor when said differential signal transmitter transmits the differential signals and operates as a dumping resistor when said single end signal transmitter transmits the single end signals.

5. An IC card according to claim 1, further comprising a memory unit and a controller, said interface unit being operable to transmit data received from the further interface unit to said memory unit, to receive data from said memory unit for delivery to the further interface unit, to transmit control signals received from the further interface unit to said controller, and to receive status signals from said controller for delivery to the further interface unit.

6. An IC card according to claim 5, wherein said pair of signal lines are data lines.

7. An IC card according to claim 5, wherein said single end signal transmitter and said single end signal receiver are disabled when said differential signal transmitter transmits the differential signals or when said differential signal receiver receives the differential signals, and said differential signal transmitter and said differential signal receiver are disabled when said single end signal transmitter transmits the single end signals or when said single end signal receiver receives the single end signals.

8. A data processing apparatus to which an IC card is removably connected, comprising:
   a pair of signal lines;
   a resistor connected across said pair of signal lines; and
   an interface unit, including:
      a differential signal transmitter operable to transmit differential signals to a further interface unit disposed in the IC card and having a first terminal and a second terminal each directly connected to an associated one of said pair of signal lines, and
      a single end signal transmitter operable to transmit single end signals to the further interface unit and having a terminal that is directly connected to a given one of said pair of signal lines via said resistor;
   said resistor thereby operating as a termination resistor when said differential signal transmitter transmits the differential signals and operating as a dumping resistor when said single end signal transmitter transmits the single end signals.

9. A data processing apparatus according to claim 8, wherein said pair of signal lines are control signal lines.

10. A data processing apparatus according to claim 8, wherein said single end signal transmitter is disabled when said differential signal transmitter transmits the differential signals, and said differential signal transmitter is disabled when said single end signal transmitter transmits the single end signals.

11. A data processing apparatus according to claim 8, wherein
   said interface unit further includes:
      a differential signal receive operable to receive differential signals from the further interface unit and having a first terminal and a second terminal each directly connected to a corresponding one of said pair of signal lines, said resistor being disposed adjacent to said first terminal and said second terminal, and
      a single end signal receiver operable to receive single end signals from the further interface unit having a terminal that is directly connected to a respective one of said pair of signal lines via said resistor; and
   said resistor thereby operates as a termination resistor when said differential signal receiver receives the differential signals and operates as a dumping resistor when said single end signal receiver receives the single end signals.

12. A data processing apparatus according to claim 8, further comprising a data processing unit and a controller, said interface unit being operable to transmit data received from the further interface unit to said data processing unit, to receive data from said data processing unit for delivery to the further interface unit, to transmit status signals received form the further interface unit to said controller, and to receive control signals from said controller for delivery to the further interface unit.

13. A data processing apparatus according to claim 8, wherein said pair of signal lines are data lines.

14. A data processing apparatus according to claim 8, wherein said single end signal transmitter and said single end signal receiver are disabled when said differential signal transmitter transmits the differential signals or when said differential signal receiver receives the differential signals, and said differential signal transmitter and said differential signal receiver are disabled when said single end signal transmitter transmits the single end signals or when said single end signal receiver receives the single end signals.

15. A system, comprising:
   a data processing apparatus;
   an IC card removably connected to said data processing apparatus; and
   a pair of signal lines connecting said data processing apparatus and said IC card;
   said data processing apparatus including:
   a first interface unit, including:
      a differential signal transmitter operable to transmit differential signals to a further interface unit disposed in the IC card and having a first terminal and a second terminal each directly connected to an associated one of said pair of signal lines, and
      a single end signal transmitter operable to transmit single end signals to said further interface unit and having a terminal that is directly connected to a given one of said pair of signal lines and that is connected to another of said pair of signal lines via said resistor;
   said further interface unit of said IC card including:
      a differential signal receiver operable to receive differential signals from said first interface unit and having a first terminal and a second terminal each directly connected to an associated one of said pair of signal lines,
      a first resistor connected across said pair of signal lines adjacent to said first terminal and said second terminal, and
      a single end signal receiver operable to receive single end signals form said first interface unit and having a terminal that is directly connected to a given one of said pair of signal lines and that is connected to a further one of said pair of signal lines via said first resistor;
   said first resistor thereby operating as a termination resistor when said differential signal transmitter of said data processing apparatus transmits the differential signals to said differential signal receiver of said IC card and thereby operating as a dumping resistor when said single end signal transmitter of said data processing apparatus transmits the single end signals to said single end signal receiver of said IC card.

16. A system according to claim 15, wherein said pair of signal lines are control signal lines.

17. A system according to claim 15, wherein said differential transmitter of said data processing apparatus is disabled when said single end signal transmitter of said data processing apparatus transmits the single end signals, said single end signal transmitter of said data processing apparatus is disabled when said differential signal transmitter of said data processing apparatus transmits the differential signals, said differential receiver of said IC card is disabled when said single end signal receiver of said IC card receives the single end signals, and said single end signal receiver of said IC card is disabled when said differential signal receiver of said IC card receives the differential signals.

18. A system according to claim 15, wherein
said first interface unit of said data processing apparatus further includes:
- a differential signal receiver operable to receive differential signals from said further interface unit and having a first terminal and a second terminal each directly connected to a corresponding one of said pair of signal lines,
- a second resistor connected across said pair of signal lines adjacent to said first terminal and said second terminal, and
- a single end signal receiver operable to receive single end signals from said further interface unit and having a terminal that is directly connected to a respective one of said pair of signal lines and that is connected to a further one of said pair of signal lines via said first resistor and via said second resistor,
- said terminal of said single end signal transmitter being connected to said another of said pair of signal lines via said first resistor and via said second resistor; and said further interface unit of said IC card further includes:
- a differential signal transmitter operable to transmit differential signals to said first interface unit and having a first terminal and a second terminal each directly connected to a corresponding one of said pair of signal lines, and
- a single end signal transmitter operable to transmit single end signals to said first interface unit and having a terminal that is directly connected to a respective one of said pair of signal lines and that is connected to a further one of said pair of signal lines via said first resistor and via said second resistor; and said second resistor thereby operates as a further termination resistor when said differential signal transmitter of said IC card transmits the differential signals to said differential signal receiver of said data processing apparatus, and said first resistor and said second resistor thereby operate as parallel-connected dumping resistors when said single end signal transmitter of said data processing apparatus transmits the single end signals to said single end signal receiver of said IC card or when said single end signal transmitter of said IC card transmits the single end signals to said single end signal receiver of said data processing apparatus.

19. A system according to claim 18, wherein said pair of signal lines are data lines.

20. A system according to claim 18, wherein said differential signal transmitter of said data processing apparatus and said differential signal receiver of said data processing apparatus are disabled when said single end signal transmitter of said data processing apparatus transmits the differential signals or when said single end signal receiver of said data processing apparatus receives the differential signals, said single end signal transmitter of said data processing apparatus and said single end signal receiver of said data processing apparatus are disabled when said differential signal transmitter of said data processing apparatus transmits the differential signals or when said differential signal receiver of said data processing apparatus receives the differential signals, said differential signal transmitter of said IC card and said differential signal receiver of said IC card are disabled when said single end signal transmitter of said IC card transmits the differential signals or when said single end signal receiver of said IC card receives the differential signals, and said single end signal transmitter of said IC card and said single end signal receiver of said IC card are disabled when said differential signal transmitter of said IC card transmits the differential signals or when said differential signal receiver of said IC card receives the differential signals.

* * * * *

UNITED STATES PATENT AND TRADEMARK OFFICE
CERTIFICATE OF CORRECTION

PATENT NO. : 6,941,402 B2
DATED : September 6, 2005
INVENTOR(S) : Jun Tashiro

It is certified that error appears in the above-identified patent and that said Letters Patent is hereby corrected as shown below:

Column 11,
Lines 1 and 3, "claim 5" should read -- claim 4 --.
Line 25, "via" should read -- and that is connected to another of said pair of signal lines via --.
Line 65, "form the" should read -- from the --.

Column 12,
Lines 1 and 3, "claim 8" should read -- claim 11 --.

Signed and Sealed this

Tenth Day of January, 2006

JON W. DUDAS
*Director of the United States Patent and Trademark Office*